United States Patent [19]

Albee, Jr. et al.

[11] 4,381,376

[45] Apr. 26, 1983

[54] PREPARATION OF LOW MOLECULAR WEIGHT COPOLYMER SALTS

[75] Inventors: Paul J. Albee, Jr., Bensalem, Pa.; Patricia E. Burdick, Lake Hiawatha; Joseph I. Wrozina, Tenafly, both of N.J.

[73] Assignee: Allied Corporation, Morris Township, Morris County, N.J.

[21] Appl. No.: 220,872

[22] Filed: Dec. 29, 1980

[51] Int. Cl.$^3$ .............................................. C08F 8/44
[52] U.S. Cl. .................................. 525/366; 525/367; 525/368; 525/369
[58] Field of Search ............... 525/366, 367, 368, 369, 525/329

[56] References Cited

U.S. PATENT DOCUMENTS

| | | | |
|---|---|---|---|
| 2,754,280 | 7/1956 | Brown et al. | 260/29.6 |
| 2,757,106 | 7/1956 | Brown et al. | 117/155 |
| 3,026,281 | 3/1962 | Harren et al. | 260/29.6 |
| 3,180,844 | 4/1965 | Dickerson | 260/30.6 |
| 3,264,272 | 8/1966 | Rees | 428/36 |
| 3,297,664 | 1/1967 | Miskel et al. | 525/329 |
| 3,322,734 | 5/1967 | Rees | 525/326 |
| 3,347,957 | 10/1967 | Adomaitis et al. | 525/221 |
| 3,393,168 | 7/1968 | Johnson | 260/29.7 |
| 3,404,134 | 10/1968 | Rees | 525/362 |
| 3,437,718 | 4/1969 | Rees | 525/195 |
| 3,491,075 | 1/1970 | Dekking | 525/370 |
| 3,649,578 | 3/1972 | Bush et al. | 260/23 AR |
| 3,655,629 | 4/1972 | Takahara | 260/369 |
| 3,658,741 | 4/1972 | Knutson | 526/88 |
| 3,705,137 | 12/1972 | Kuwahara et al. | 526/62 |
| 3,779,952 | 12/1973 | Leonard | 260/2.5 R |
| 3,789,035 | 1/1974 | Iwami et al. | 525/228 |
| 3,943,111 | 3/1976 | Fritze et al. | 260/384 |
| 3,969,434 | 7/1976 | Powell et al. | 525/196 |
| 3,970,626 | 7/1976 | Hurst et al. | 260/29.6 WB |
| 4,248,990 | 2/1981 | Pieski et al. | 525/369 |

FOREIGN PATENT DOCUMENTS

| | | | |
|---|---|---|---|
| 835457 | 2/1970 | Canada . | |
| 1306590 | 9/1962 | France . | |
| 42-7334 | 3/1967 | Japan | 525/369 |

Primary Examiner—Paul R. Michl
Attorney, Agent, or Firm—Richard A. Negin

[57] ABSTRACT

A method for forming ionic copolymer salts from low molecular weight copolymer acids formed from ethylene and an alpha,beta-ethylenically unsaturated carboxylic acid having at least one carboxylic acid group, and cations having a valence of 1 to 3. The copolymer acid and the cation containing material are fed to a reaction vessel. The reaction vessel is maintained below atmospheric pressure, for at least a portion of the time, so that the oxygen content of the reaction vessel is minimized and volatile reaction products are removed. The reacting mixture is continually stirred or mixed within the reaction vessel. The temperature within the reaction vessel is controlled and maintained above the melting point of the polymer.

39 Claims, No Drawings

PREPARATION OF LOW MOLECULAR WEIGHT COPOLYMER SALTS

DESCRIPTION

BACKGROUND OF THE INVENTION

This invention relates to a method of preparation of ethylene-alpha,beta-ethylenically unsaturated carboxylic acid copolymer salts; more particularly, this invention relates to the preparation of the metallic salts of low molecular weight copolymers of ethylene and an alpha,beta-ethylenically unsaturated carboxylic acid.

It is known in the art to produce ionic metal salts from copolymers of at least one alpha-olefin of a general formula $RCH=CH_2$ where R is a radical selected from the class consisting of hydrogen and alkyl radicals having from 1 to 8 carbon atoms, and an alpha,beta-ethylenically unsaturated carboxylic acid. Such ionic hydrocarbon polymers and processes for preparing them, as well as processes for preparing ionically cross-linked copolymers are described in U.S. Pat. Nos. 3,264,272; 3,649,578; 3,969,434; 3,404,134; 3,789,035; 3,970,626; and 3,779,952.

A review of the art, including the above-noted patents, shows that the prior art copolymer salts and processes for making them are generally directed to salts made from relatively high molecular weight copolymers. The reaction is generally carried out at superatmospheric pressures as high as 10,000 psi.

Attempts to form metallic low molecular weight copolymer salts of ethylene and alpha,beta-ethylenically unsaturated carboxylic acids at atmospheric pressure or higher pressures have resulted in reaction product volatiles being trapped in the low molecular weight copolymer salt reaction product. Discoloration often results as a result of excessive exposure to heat and the presence of oxygen at elevated temperatures during the preparation of these low molecular weight copolymer acid salts.

SUMMARY OF THE INVENTION

In accordance with this invention, a method has been found for making ionic copolymer salts from low molecular weight copolymer acids formed from ethylene and an alpha,beta-ethylenically unsaturated carboxylic acid having at least one carboxylic acid group, and cations having a valence of 1 to 3. The copolymer acid and the cation containing material are fed to a reaction vessel. During the reaction, the reaction vessel is maintained below atmospheric pressure for at least a portion of the time, so that the oxygen content of the reaction vessel is minimized and volatile reaction products are removed. The reacting mixture is continually stirred or mixed within the reaction vessel. The temperature within the reaction vessel is controlled and maintained above the melting point of the polymer.

A preferred embodiment of the present invention is a process where the copolymer acid has an acid number from 40 to 160, and a molecular weight of from about 500 to about 20,000, preferably from 1,000 to 15,000, more preferably from 1,000 to 6,000 and most preferably from 1,000 to 3,500. The copolymer acid is preferably ethylene acrylic acid and the cation containing material is preferably derived from a metal selected from Groups IA, IIA, IIB and IIIA of the Periodic Table of Elements. The copolymer acid and cation containing material are fed to a reaction vessel. The temperature in the reaction vessel is heated to and maintained above the melting point of the polymer, preferably from about 120° C. to about 300° C., more preferably from about 140° C. to about 260° C., and most preferably from about 180° C. to about 220° C. During the reaction, the pressure is reduced below atmospheric pressure for at least a portion of the time. Preferably, the pressure is reduced to from 15 inches of mercury up to 29.9 inches of mercury (less than 1 atmosphere), more preferably the pressure is from 20 to 28 inches of mercury, and most preferably from 24 to 26 inches of mercury. The reaction proceeds for at least one half hour of reaction time, with the pressure reduced for at least 10 minutes during the latter half of the time. The reaction is preferably conducted under an inert gas such as nitrogen. Preferably, the reaction proceeds from one hour to about five hours, more preferably from two hours to four hours, with the pressure reduced for at least 10 minutes during the last hour.

The objects, features and advantages of the present invention will become apparent by reference to the following specification:

DESCRIPTION OF THE PREFERRED EMBODIMENTS

The present invention is a process for producing ionic copolymer salts from low molecular weight copolymer acids. The copolymer acids are made from ethylene and an alpha,beta-ethylenically unsaturated carboxylic acid having at least one carboxylic acid group. In the process, the carboxylic acid groups of the copolymer are neutralized by cations having a valence of 1 to 3. The copolymer acid and material containing a cation are fed to a reaction vessel. The reaction vessel is maintained at a vacuum or subatmospheric pressure for at least a portion of the time. During the reaction, the reacting mass is continually mixed within the reacting vessel. Additionally, the temperature within the reaction vessel is controlled and maintained above the polymer melting point. The reaction can proceed until no volatiles are observed or measured coming from the reacting mass. It is to be recognized that although the process description and examples to follow are directed to a batch type process, the process of the present invention is adaptable to a continuous process.

The temperature within the reaction vessel is controlled to assure volatilization of the volatilizable reaction products as they are produced. The predominant volatile is water produced on neutralization of the copolymer acid. The temperature is maintained above the melting point or softening point of copolymer acid and resulting copolymer salt. Preferably, the temperature is maintained from about 120° C. to about 300° C., and more preferably from about 140° C. to about 260° C., and most preferably from about 180° C. to about 220° C. It has been found that the volatiles of the preferred copolymer salts are removed resulting in a uniform copolymer salt free of volatiles when heated to above a lower limit, preferably about 180° C. Yet by maintaining an upper limit on temperature, preferably below 220° C., the copolymer salts do not experience deleterious effects of heat, such as discoloration, particularly when oxygen is present.

The reaction begins to take place soon after the copolymer salt and cation containing material are fed into the reactor vessel. To assure a uniform product, the copolymer salt and cation containing material are preferably mixed in the vessel. The reaction can proceed for as long as necessary for it to be complete. However, to assure a uniform product free from volatiles, it is preferred that the reaction proceed for at least one-half hour. Preferably, the reaction should proceed from one hour to five hours, and more preferably from two hours to four hours. It is important to maintain the reacting mass in the vessel so that all volatiles generated during the reaction can be removed. The volatiles volatilize due to the temperature in the reacting vessel.

Even with the reacting mass continually mixed, and a high enough temperature maintained for a sufficient length of time, it has been found that the pressure must be maintained below atmospheric pressure for a portion of the time. Preferably, the pressure is reduced to from 15 inches of mercury up to 29.9 inches of mercury (less than one atmosphere). More preferably, the pressure is reduced to from 20 to 28 inches of mercury, and most preferably from 24 to 26 inches of mercury. Preferably, the pressure is reduced for at least ten minutes during the second half of the time the reaction proceeds. More preferably, the pressure is reduced for at least ten minutes, and preferably from ten minutes to 30 minutes, during the last hour of the reaction.

The use of a vacuum for at least a portion of the time causes the volatiles to be pulled off. It is not necessary to have a protective nitrogen atmosphere over the reaction mass when a vacuum is used during the entire process. The vacuum provides an oxygen-free reaction vessel chamber so that the oxidation is prevented.

For the purposes of the present invention, the reaction is considered to include both the neutralization reaction and the release of the volatiles while the mass is in the reaction vessel. The reaction time is the time the mass is in the reactor. Preferably, the reaction proceeds under the blanket of an inert gas, preferably nitrogen, within the reaction vessel.

The neutralization of low molecular weight copolymer acids at atmospheric or super-atmospheric pressures results in the volatiles being trapped in the reacting mass. The trapped volatiles result in bubbles in the mixture and make characterization of the reaction product impossible. The reaction product forms a nonuniform uncontrolled copolymer salt. Copolymer salts produced in the presence of oxygen and at least atmospheric pressure were yellow in appearance and contained many gels.

The above-noted factors are particularly important in the process of the present invention where the molecular weight of the copolymer acid is so low that the only feasible way of neutralization to form a copolymer salt is in a reaction vessel. The molecular weights of the copolymer acids are so low that the viscosity is too low for processing in the manner described in the referenced prior art patents, i.e. extruders and on mills. Therefore, the present invention provides a method to easily neutralize low molecular weight copolymer acids to form corresponding copolymer salts which are color stable, uniform in appearance and have reaction volatiles removed.

The alpha,beta-ethylenically unsaturated carboxylic acids which can be copolymerized with ethylene preferably have 3 to 8 carbon atoms. Examples of such acids include acrylic acid, methacrylic acid, ethacrylic acid, itaconic acid, maleic acid, fumaric acid and monoesters of other dicarboxylic acids such as methyl hydrogen maleate, methyl hydrogen fumarate, ethyl hydrogen fumarate, and maleic anhydride which is considered to behave like an acid and be an acid in the present invention. The concentration of the ethylene in the copolymer is at least 50 mol percent, preferably above 75 mol percent, and more preferably 80 to 95 mol percent.

A preferred alpha,beta-ethylenically unsaturated monocarboxylic acid is acrylic acid. The ethylene acrylic acid copolymer has an acid number in the range from about 1 to about 180, with an acid number from about 40 to about 160 being preferred, and an acid number from about 40 to about 120 being most preferred. The acid number is determined by the number of milligrams of potassium hydroxide to neutralize one gram of acid. The molecular weight of the copolymer acid is from about 500 to about 20,000, preferably from 1,000 to 15,000, more preferably from 1,000 to 6,000, and most preferably from 1,000 to 3,500.

The low molecular copolymer acids used to make the copolymer salts of the present invention can be prepared by any suitable process known in the art. An example method is described in U.S. Pat. No. 3,658,741, which is incorporated herein by reference. Of particular interest in U.S. Pat. No. 3,658,741 is the passage beginning at column 7, line 36 through column 8, line 6:

"The ethylene desirably constitutes at least 65% by weight of the monomer feed and the comonomer from 1.0% to 35% of the feed, preferably 2 to 20% by weight of the feed. Under the specific conditions of our vapor phase polymerization the ratios by weight of the monomers in the feed and in the product are desirably substantially constant and variance in ratio between feed and product at most only minor such that products obtained by the invention contain a major portion of ethylene and generally 0.8% to 35% by weight of the comonomer, preferably 2.0% to 20% by weight of the comonomer with optimum portions depending largely on the particular comonomer and intended use of the copolymer product. Generally, having less than a major portion of ethylene in the feed increasingly tends to produce products of undesirable softness. Having less than about 1% ethylene in the monomer tends to make it increasingly difficult to insure production of homogeneous polymers although one advantage of the invention is that homogeneous polymers may be produced with 15% or even somewhat less ethylene in the feed. It will be evident that advantageous feature of our process is the ability to maintain ratios of comonomer in the product to comonomer in the feed within the range of 0.7:1 to 1.8:1 which represent ratios substantially different than those commonly encountered in previously proposed processes with comonomers such as acrylic acid. The copolymers produced by the invention are of low molecular weight ranging generally between about 500 to 5,000 number average molecular weight, preferably between 1,000 to 3,000 number average molecular weight, as measured by a vapor pressure osmometer. The copolymers also desirably have viscosity not exceeding about 1500 centipoises at 140° C., preferably between 100 to 1200 centipoises at 140° C. A variety of new and useful copolymers are provided by the present invention. Of special interest are the homogeneous copolymers of ethylene and acrylic or methacrylic acid containing 1% to 20% by weight acrylic acid or methacrylic acid in the copolymer, preferably 3.5% to 12%, and further characterized by a number average molecular weight between 500 to 5,000, preferably 1500 to 4000, acid number between 10 to 200, preferably 20 to 130, and hardness (0.1 mm, penetration) between 0.5 to 30, preferably 1 to 10 when tested at room temperature (77° F.) with an ASTM needle with a load of 100 grams for 5 seconds."

Although various alpha,beta-ethylenically unsaturated carboxylic acid copolymers may be used, as noted above, it is preferred to use ethylene acrylic acid copolymers. Table I below characterizes three preferred ethylene acrylic copolymers which can be used in this process. These acids have molecular weights in the range of from 1,000 to 3,500.

TABLE I

| Copolymer Acid | Melting Pt. (ASTM E-28) °C. | °F. | Hardness dmm (ASTM D-5) | Density g/cc (ASTM D-1505) |
|---|---|---|---|---|
| A | 108 | 226 | 2.0 | 0.93 |
| B | 102 | 215 | 4.0 | 0.93 |
| C | 92 | 198 | 11.5 | 0.93 |

| Copolymer Acid | Brookfield Viscosity @ 140° C. cps | Acid No. mg KOH/g | Wt. % Acrylic Acid |
|---|---|---|---|
| A | 500 | 40 | 5 |
| B | 650 | 80 | 8 |
| C | 650 | 120 | 15 |

Cations having valences of 1 to 3 can be used to neutralize the copolymer acid. Preferably, metallic cations are derived from a group of metals which can be chosen from Groups IA, IIA, IIIA and the transition elements of the Periodic Table of Elements to be used in this process. Metal cations which are preferred are sodium, potassium, magnesium, calcium, barium, zinc and aluminum cations, with calcium cations being most preferred. Cation containing materials can be metal salts including: oxides, hydroxides, acetates, methoxides, nitrates, carbonates and bicarbonates. Metallic salts containing materials which are illustrated in the examples discussed below include calcium hydroxide, calcium acetate, magnesium oxide and zinc acetate. The copolymer acid can be neutralized up to 100 percent; however, it is preferred to neutralize from 15 to 60 percent and more preferably from 25 to 50 percent neutralization of the carboxylic acid groups of the copolymer acid using the process of the present invention.

During the reaction, the temperature should be kept above the melting point of the copolymer acid. In the case of the copolymer acids shown in Table I, the reaction temperature is at least above the listed melting points to assure the removal of all volatiles and allow the continual mixing and handling of the reaction product of the copolymer salt. Of course, the temperature can be optimized or varied depending on the particular copolymer salt being produced. When a metallic cation having a valence greater than one is used with a given copolymer acid, ionic crosslinking more readily takes place and the viscosity of the reaction product increases as the neutralization level increases.

Copolymer acid salts produced by the method of the present invention are cream white in appearance and have few gel type impurities. The copolymer salts are uniform in appearance and have good color stability. The mixing was good and all volatiles were released and removed leaving a very smooth and well dispersed material.

Following are several examples which illustrate the nature of the invention and a manner of carrying it out. Although the following examples are conducted in a batch type laboratory setup, it is appreciated that the method of the present invention can be conducted continuously. The invention should not be limited to the details of these examples.

EXAMPLES 1-6

Examples 1-6 were conducted to neutralize the ethylene-acrylic acid copolymers referred to in Table I with calcium hydroxide. Sufficient calcium hydroxide was used to neutralize about 25 percent and about 50 percent of the carboxylic groups of the salts on the acrylic acid copolymers. Table II below shows the percent by weight of calcium hydroxide required to attain this neutralization.

The reaction was conducted in the laboratory using a glass reaction vessel. The reaction vessel was held within a heating mantle, connected to a variac, electric heat source. A laboratory vacuum line at about 30 mm Hg was connected to the glass reaction vessel and the entire reaction took place under a vacuum. The negative pressure pulled off volatiles and also hindered any discoloration due to oxidation. A glass stirrer kept the copolymer salt that formed and the copolymer agitated during the reaction and aided dispersion. This eliminated an over abundance of gels due to poor dispersion in the reaction mass.

The temperature was controlled to about 250° C. The reaction was allowed to continue at this temperature until completion or until no more volatiles came from the reacting mass within the reaction vessel. Generally, the reaction took on the order of about 3 hours. However, the time varied with the percentage of neutralization and the reaction temperature.

Depending on the circumstances the time and temperature can be varied with reaction products, percent neutralization, and equipment.

TABLE II

| Example | Copolymer Acid | % Neutralized | % By Wt. Ca(OH)$_2$ | Brookfield Viscosity @ 140° C. cps |
|---|---|---|---|---|
| Control A | A | 0 | 0 | 627 |
| 1 | A | 25 | 0.67 | 1,610 |
| 2 | A | 50 | 1.33 | 5,550 |
| Control B | B | 0 | 0 | 660 |
| 3 | B | 25 | 1.25 | 3,875 |
| 4 | B | 50 | 2.50 | 24,627 |
| Control C | C | 0 | 0 | 695 |
| 5 | C | 25 | 2.0 | 9,550 |
| 6 | C | 50 | 4.0 | 34,125 |

A review of Tables I and II shows that as the acid number of the sample increases so does the amount of calcium hydroxide required for the same percentage of neutralization. A copolymer having twice as many carboxylic groups requires approximately twice as much calcium hydroxide to achieve the same level of neutralization. Calcium hydroxide results in a metallic cation having a valence of two. This provides two sites for neutralization and the formation of ionic crosslinks. Therefore, as the concentration of the salt increases for a given amount of acid at the same neutralization, more ionic crosslinking is expected and the viscosity is expected to increase. This is exactly what was observed. There is a substantial increase in viscosity in going from 0 to 25% neutralization and a greater increase in viscosity in going from 25 to 50% neutralization. In fact, in going from 25% to 50% neutralization of copolymer acid C, the mixing became more difficult, greater number of gels appeared and dispersion was poorer. The salts of copolymer acid C had good appearance and handled well only at the lower 25% neutralization. In particular, the increased viscosity for copolymer acid C at 50% neutralization was not manageable in the experimental laboratory reaction apparatus. The glass stirrer could not handle the fast viscosity build up. Table II compares the viscosity build up of the various samples and the change in viscosity in going from 0 to 50% neutralization.

EXAMPLES 7-11

Examples 7-11 used the same method and laboratory conditions as Examples 1-6. As shown in Examples 1-6, the viscosity increases with the percent neutralization when using a divalent cation. This limited the flexibility of the experiment in the laboratory. In Examples 7-11, copolymer acid A was studied in more detail with regard to viscosity as a function of neutralization. Table III below shows the change in viscosity at 10% intervals of neutralization from 0 to 50% neutralized copolymer acid A of Table I.

TABLE III

| Example | Copolymer Acid | % Neut $(Ca(OH)_2)$ | Viscosity Brookfield @ 140° C. cps |
|---|---|---|---|
| Control D | A | 0 | 417 |
| 7 | A | 10 | 585 |
| 8 | A | 20 | 875 |
| 9 | A | 30 | 1,350 |
| 10 | A | 40 | 1,875 |
| 11 | A | 50 | 5,550 |

EXAMPLES 12-15

Examples 12-15 were conducted in the laboratory under the same conditions as Examples 1-6. The salts evaluated are calcium hydroxide, calcium acetate, magnesium oxide and zinc acetate. In these examples, it was the goal to neutralize the copolymer acid B to 50% with each of the above listed salts. The results are shown in Table IV below:

TABLE IV

| Example | Copolymer Acid | Cation Material | Viscosity Brookfield @ 140° C. cps |
|---|---|---|---|
| 12 | B | $Ca(OH)_2$ | 24,625 |
| 13 | B | $Ca(C_2H_3O_2)_2$ | 45,750 |
| 14 | B | MgO | 24,825 |
| 15 | B | $Zn(C_2H_3O_2)_2$ | 47,250 |

It was observed that the zinc acetate had a yellow discoloration due to the high temperature it was exposed to during production.

In addition to the above examples, viscosity increases were observed when copolymer acid B was mixed with sodium hydroxide and aluminum hydroxide.

EXAMPLES 16-18

Examples 16-18 were conducted to neutralize copolymer acid B referred to in Table I. Examples 16-18 are three runs using the following process: The reaction was conducted in a three liter reaction vessel with continual stirring. In each example the reaction vessel was charged with 1,350 grams of copolymer acid B and 2.38% based on the weight of the copolymer of $Ca(OH)_2$. The $Ca(OH)_2$ is present in an amount sufficient to neutralize 48% of the copolymer acid carboxylic acid groups. The reaction proceeded for three hours. During the first two hours the temperature was raised to 200° C., at approximately a constant rate. The temperature was held at 200° C. for one additional hour.

The reaction was conducted under a nitrogen atmosphere at one atmosphere pressure. At the end of two hours, while the temperature was held at 200° C., a vacuum pressure of about 25 inches of mercury was applied for 15 minutes. Nitrogen at one atmosphere pressure was admitted to the vessel for the remaining 45 minutes. The nitrogen was used to help sweep the volatiles away.

Table V below summarizes the viscosity and hardness of the copolymer salt obtained in Examples 16-18.

TABLE V

| Example | Brookfield Viscosity @ 140° C. cps | Penetration Hardness dmm (ASTM D-5) |
|---|---|---|
| 16 | 37,700 | .9 |
| 17 | 37,600 | .8 |
| 18 | 37,300 | .9 |

It is noted that the viscosity is higher in Examples 16-18 than Example 4 and 12. It is believed that the higher viscosity results from the conditions used in the process of Examples 16-18, and more heavy duty equipment, particulary for stirring the mass.

EXAMPLE 19

Repeat Example 18 where the copolymer acid is an ethylene methacrylic acid copolymer.

EXAMPLE 20

Repeat Example 18 where the copolymer acid is an ethylene ethacrylic acid copolymer.

Comparative Study

A study was run in which copolymer acid C was reacted with about 4% $Ca(OH)_2$ in a Brabender sigma mixing bowl at 202° C. and 40 rpm for 20 minutes. The 4% $Ca(OH)_2$ theoretically should react to neutralize 50% of the carboxylic acid groups of copolymer acid C. The reaction was conducted at atmospheric pressure, exposed to air. No dispersed particles or gels due to poor dispersion were observed. Volatiles were trapped and the product yellowed from oxidation.

While exemplary embodiments of the invention have been described, the true scope of the invention is to be determined from the following claims.

What is claimed is:

1. A method of making ionic copolymer salts from copolymer acids formed from ethylene and an alpha,-beta-ethylenically unsaturated carboxylic acid having at least one carboxylic acid group, the copolymer acid having a number average molecular weight of from 500 to 5000, and at least 50 mol percent ethylene, the copolymer acid being neutralized by cations selected from a group having a valence of 1 to 3, comprising the steps of:

feeding the copolymer acid and a cation containing material to a reacting vessel;

maintaining a vacuum in the reaction vessel;

mixing the reacting mixture within the reaction vessel; and maintaining the temperature within the reaction vessel above the melting point of the copolymer acid.

2. The method as recited in claim 1 wherein the alpha,beta-ethylenically unsaturated carboxylic acid has 3 to 8 carbon atoms.

3. The method as recited in claim 1 wherein the copolymer acid has a number average molecular weight from 1,000 to 3000.

4. The method as recited in claim 3 wherein the alpha,beta-ethylenically unsaturated carboxylic acid is selected from the group consisting of acrylic acid, methacrylic acid, ethacrylic acid, maleic acid and fumaric acid.

5. The method as recited in claim 4 wherein the copolymer acid has at least 50 mol percent ethylene.

6. The method as recited in claim 5 wherein the copolymer acid has at least 75 mol percent ethylene.

7. The method as recited in claim 6 wherein the copolymer acid has from 80 to 95 mol percent ethylene.

8. The method as recited in claim 1 wherein the cations are derived from a group of metals which are selected from Groups IA, IIA, IIIA and the transition elements of the Periodic Table of Elements.

9. The method as recited in claim 8 wherein the metal is selected from the group consisting of sodium, potassium, magnesium, calcium, barium, zinc and aluminum.

10. The method as recited in claims 3 or 9 wherein the cation containing material is selected from the group including metal: oxides, hydroxides, acetates, methoxides, ethoxides, nitrates, carbonates and bicarbonates.

11. The method as recited in claims 8 or 9 wherein the alpha,beta-ethylenically unsaturated carboxylic acid is acrylic acid.

12. The method as recited in claim 11 wherein from about 15% to about 60% of the carboxylic acid groups of the copolymer acid are neutralized.

13. The method as recited in claim 12 wherein from 25% to 50% of the carboxylic acid groups of the copolymer acid are neutralized.

14. The method as recited in claim 12 wherein the metal cation is the cation of calcium.

15. The method as recited in claim 14 wherein the cation containing material is calcium hydroxide.

16. The method as recited in claim 11 wherein the cation containing material is selected from a group consisting of $Ca(OH)_2$, $Ca(C_2H_3O_2)_2$, MgO, NaOH and $Zn(C_2H_3O_2)_2$.

17. The method as recited in claim 11 wherein the copolymer of ethylene and acrylic acid has an acid number from about 1 to about 180.

18. The method as recited in claim 17 wherein the copolymer of ethylene and acrylic acid has an acid number from about 40 to about 160.

19. The method as recited in claim 18 wherein the copolymer of ethylene and acrylic acid has an acid number from about 40 to about 120.

20. The method as recited in claim 11 wherein the cation containing material is selected from the group including metal: oxides, hydroxides, acetates, methoxides, ethoxides, nitrates, carbonates and bicarbonates.

21. A method of making ionic copolymer salts from copolymer acids formed from ethylene and an alpha,-beta-ethylenically unsaturated carboxylic acid having at least one carboxylic acid group, the copolymer acid having a number average molecular weight of from 500 to 5000, and at least 50 mol percent ethylene, the copolymer acid being neutralized by cations selected from a group having a valence of 1 to 3, comprising the steps of:

feeding the copolymer acid and a cation containing material to a reaction vessel;

conducting the reaction for at least one-half hour of reaction time;

maintaining a reduced pressure in the reaction vessel from 15 to 29.9 inches of mercury for at least a portion of the reaction time;

maintaining the temperature in the reaction vessel from about 120° C. to about 300° C.; and mixing the reacting mixture within the reaction vessel.

22. The method as recited in claim 21 further comprising the step of heating the reaction temperature to from 120° C. to 300° C. after the feeding step.

23. The method as recited in claim 21 further comprising the step of maintaining an inert atmosphere within the reaction vessel.

24. The method as recited in claim 23 wherein the inert atmosphere is nitrogen.

25. The method as recited in claims 21 or 24 wherein the alpha,beta-ethylenically unsaturated carboxylic acid is selected from the group consisting of acrylic acid and methacrylic acid.

26. The method as recited in claim 25 wherein the alpha,beta-ethylenically unsaturated carboxylic acid is acrylic acid.

27. The method as recited in claim 25 wherein the copolymer acid has a number average molecular weight from 1,000 to 3000.

28. The method as recited in claim 26 wherein the copolymer acid has from 80 to 95 mol percent ethylene.

29. The method as recited in claim 26 wherein from about 15% to about 60% of the carboxylic acid groups of the copolymer acid are neutralized.

30. The method as recited in claim 29 wherein from 25% to 50% of the carboxylic acid groups of the copolymer acid are neutralized.

31. The method as recited in claim 25 wherein the cations are derived from a metal selected from the group consisting of sodium, potassium, magnesium, calcium, barium, zinc and aluminum.

32. The method as recited in claim 31 wherein the reaction time is maintained from 1 hour to about 5 hours.

33. The method as recited in claim 32 wherein the reaction vessel is heated to from about 140° C. to about 260° C. and maintained at from 140° C. to about 260° C.

34. The method as recited in claim 33 wherein the reaction vessel is heated to from 180° C. to 220° C. and maintained at from 180° C. to 220° C.

35. The method as recited in claim 32 wherein the reduced pressure is maintained from 15 to 29.9 inches of mercury for at least 10 minutes of the last half of the reaction time.

36. The method as recited in claim 35 wherein the reduced pressure is from 20 to 28 inches of mercury.

37. The method as recited in claim 36 wherein the reduced pressure is from 24 to 26 inches of mercury.

38. The method as recited in claim 35 wherein the reduced pressure is maintained for at least 10 minutes of the last hour of reaction time.

39. The method as recited in claim 21 wherein:
the reaction time is from 2 to 4 hours;
the reaction vessel is heated to 180° C. to 220° C.;
the reaction vessel is maintained at 180° C. to 220° C.; and
the pressure in the reaction vessel is reduced for from 10 minutes to 45 minutes during the last hour of reaction time.

* * * * *